United States Patent Office 3,497,338
Patented Feb. 24, 1970

3,497,338
METHOD OF PRODUCING ELECTRICAL INSULATING METAL-CLAD LAMINATES
Shigenobu Narazaki, 46 1-chome, Higashi-Yamamoto-Shin-machi, Yao-shi, Japan; Kazumoto Teraguchi, 53 Higashi-Hon-machi, Akashi-shi, Japan, and Yukihiro Kameno, 4317 Oaza Ishibe, Ishibe-machi, Koga-gun, Shiga-ken, Japan
No Drawing. Filed Feb. 14, 1967, Ser. No. 615,915
Claims priority, application Japan, Sept. 29, 1966, 41/63,733
Int. Cl. C04b *43/00, 39/00;* B32b *31/00*
U.S. Cl. 65—18    4 Claims

ABSTRACT OF THE DISCLOSURE

This invention relates to a method of producing electrical insulating metal-clad laminates, which are characterized by not containing any organic substance. In accordance with this invention, a glass bonded mica plate is joined with and on a metal sheet, intermediate a porcelain enamel while the porcelain enamel is formed. The product is highly resistant against heat and secular change.

DESCRIPTION OF THE PRIOR ART

Heretofore, glass bonded mica plate, so-called Mycalex plate, has been well known and such plate as above joined with a metal sheet has also been well known. However, to effectuate the joining organic substances as adhesives have been used, so that, while highly resisting material against heat as inorganic substances and metals are used in forming the product, the product is disadvantageously low in heat resistance due to the existence of the low heat resisting organic adhesives. Heretofore a method has been proposed to join a glass bonded mica plate with a porcelain enamelled metal sheet, and in accordance with such proposed method, it was possible to provide a highly heat resistant jointure of the plate with the sheet; however, such proposed method is complicated and in addition, it is difficult to obtain an evenly porcelain enamelled sheet by such method.

SUMMARY OF THE INVENTION

Briefly stated in accordance with one aspect of this invention, there is provided a method of producing electrical insulating metal-clad laminates, which comprises the steps of mixing mica powder, glass powder, and an oxidant which frees oxygen by thermal decomposition thereof at a temperature of from 572 to 932° F. and forming a tablet of the mixture. At least a surface of a metal sheet is covered by enamel frit, and the tablet is placed on the enamel frit covered surface, after which the metal sheet is baked to form a porcelain enamel, the baking being further continued under pressure so as to complete the formation of porcelain enamel thereby integrating the metal sheet with glass bonded mica plate which has been formed by baking the tablet.

The oxidant to be mixed with mica powder and glass powder to form the tablet includes sodium nitrate, sodium nitrite, potassium nitrate and potassium nitrite. The oxidant serves to oxidize the jointure of the glass bonded mica plate with the porcelain enamelled surface of the metal sheet homogeneously it being essential to adjust the quantity of the oxidant in order to prevent the product from becoming porous.

The mixture of mica powder, glass powder, and the oxidant is kneaded with a small quantity of water and pressed in a mould at a normal temperature to form a tablet. Then the tablet is placed on a surface of a metal sheet which has been covered by enamel frit. The metal sheet covered by enamel frit on which the tablet is placed is baked at a temperature of from 1112 to 1652° F. for a period of about 30 minutes in a furnace. In the meantime a metal mould having a corresponding size is kept at a temperature of from 662 to 842° F. by preheating, and placed in a press. The metal sheet is taken out of the furnace and placed on the metal mould in the press as soon as possible whereby the metal sheet together with the material carried thereon while being prevented from sudden cooling and solidification of the material aforesaid by virtue of the fact that the mould is preheated so that a glass bonded mica plate formed from the tablet is integrated with a porcelain enamel sheet which has been formed from the enamel frit, which has been bonded and joined with and on the metal sheet, forming an electrical insulating metal-clad laminate.

An object of this invention is to provide a method of producing electrical insulating metal-clad laminates having a high heat resistance, overcoming the hereinbefore-stated drawbacks in the well known technique.

Another object of this invention is to provide a method of producing electrical insulating metal-clad laminates having a high resistance under heating change.

By virtue of the method in accordance with this invention, the electrical insulating metal-clad laminates may be produced extremely promptly.

In accordance with this invention, when a metal sheet, of which oxidation is difficult, is to be used, the metal sheet may be plated with another metal which is easily oxidized. Such a plated metal sheet may be used in a similar manner as above mentioned.

DESCRIPTION OF THE PREFERRED EMBODIMENTS

The invention is further disclosed in the following examples, which are illustrative but not limitative thereof

Example 1

A tablet was formed from the following mixture:

(a) 50 parts by weight of synthetic mica powder, of which grain size was from 30 to 200 mesh;
(b) 49.5 parts by weight of glass powder containing PbO, $Na_2O$, $K_2O$, $Li_2O_4$, ZnO, $SiO_2$, $AlF_3$, etc. and having a softening degree of 932° F.; and
(c) 0.5 part by weight of sodium nitrite, of which grain size was about 100 mesh.

For forming the tablet from the mixture a small quantity of water is utilized and a pressure of about 7100 p.s.i. at a normal temperature is applied.

A copper sheet was covered by enamel frit, on which the tablet was placed. The copper sheet carrying the tablet was placed on a polished plate which was then transferred into a furnace, where the copper sheet was baked at a temperature of 1112° F. for a period of from 30 to 40 minutes.

A mold, in which the polished plate carrying the enamel frit covered copper sheet was adapted to be placed, had been provided, placed in a press, and preheated up to and was kept at a temperature of 752° F. The polished plate carrying the enamel frit covered copper sheet was transferred from the furnace into the preheated mold, and placed in press as soon as possible and pressed at a pressure of 7100 p.s.i. for five minutes while being prevented from sudden cooling and solidification of materials carried on the copper sheet by virtue of the preheated mold, whereby glass bonded mica plate formed from the tablet was integrated with porcelain enamel formed from the enamel frit and joined with and on the copper sheet, forming an electrical insulating metal-clad laminate.

The electrical insulating metal-clad laminate thus produced was tested. It was found that the metal-clad laminate has the following desirable characteristics:

| | |
|---|---|
| Specific resistance (at normal state) | $3.14 \times 10^{14}$ ohm/cm. |
| Insulation resistance (at normal state) | $3.77 \times 10^{13}$ ohm. |
| Dielectric constant (1 mc.) | 6.4 |
| Dielectric power factor (1 mc.) | $79 \times 10^{-4}$. |
| Puncture voltage through layer | Over 10 kv./mm. |
| Arc-proof property | 242 seconds. |

Furthermore, the metal-clad laminate was tested in the following manner: It was maintained in molten solder at a temperature of 572° F. for a period of more than 15 minutes, but no disorder of it was found. It was boiled in trichloroethylene for five minutes, but no disorder of it was found.

Example 2

This example was carried into effect similarly to the preceding example but a permalloy sheet was substituted for the copper sheet in the preceding example. The permalloy (an alloy of iron with nickel) sheet was at first plated with copper up to a thickness of from 7 to 10 microns. The copper plated permalloy surface was then covered by enamel frit. Subsequently, similar operations to the preceding example were carried out.

Example 3

A tablet was formed as in the Example 1 from a mixture of (a) 50 parts by weight of synthetic mica powder and
(b) 50 parts by weight of glass powder.

A copper sheet was treated with flame at a temperature of about 932° F. in the atmosphere so as to form cupric oxide film on the surface of the sheet. Enamel frit was placed on the cupric oxide coated surface obtained as above and integrated with the glass bonded mica plate formed from the tablet placed on the enamel frit in the similar manner as in the preceding examples.

Example 4

This example was carried into effect similarly to Example 1, but aluminum sheet was substitute for the copper sheet in the Example 1. At first, the aluminum surface was oxidized so as to form an oxide film or so-called almite thereon. Then the almite surface was covered by enamel frit, on which the tablet was placed and treated in the similar manner as in Example 1.

Example 5

At first a surface of copper sheet was oxidized by treating it with a concentrated aqueous solution of potassium bichromate at a temperature of from 122 to 140° F. for three minutes so as to form a film of an oxide having a thickness of from 7 to 10 microns. Such an oxidized surface of the copper sheet as above was covered by enamel frit, on which the tablet was placed an treated in the similar manner as in Example 1.

Example 6

In this example, an aluminum sheet was substituted for the copper sheet in Example 5 so that it required a period of five minutes for the potassium bichromate treatment correspondingly to the period of three minutes in case of copper sheet. Other operations were quite similar to Example 5.

Example 7

In this example, permalloy sheet was substituted for the copper sheet in Example 5 so that it was required to subject the potassium bichromate treatment for a period of ten minutes correspondingly to the period of three minutes in case of copper sheet. Other operations were quite similar to the Example 5.

What is claimed as new and desired to be secured by Letters Patent of the United States is:

1. A method of producing electrical insulating metal-clad laminates, comprising steps of mixing mica powder, glass powder, and an oxidant comprising a member of the group consisting of sodium nitrate, sodium nitrite, potassium nitrate and potassium nitrite which frees oxygen by thermal decomposition thereof at a temperature of from 572 to 932° F., forming a tablet of said mixture, covering a surface of a metal sheet with enamel frit, placing said tablet on said enamel frit covered metal sheet surface, baking at least at 1120° F. said enamel frit covered metal sheet, on which said tablet has been placed, and pressing said baked metal sheet while being prevented from sudden cooling and solidification of the tablet and enamel frit carried on said metal sheet whereby said tablet is integrated with the procelain enamel covered metal sheet.

2. A method of producing electrical insulating laminates in accordance with claim 1 wherein the glass powder comprises PbO, $Na_2O$, $K_2O$, $Li_2O$, ZnO, $SiO_2$, and $AlF_3$, and having a softening temperature of 932° F.

3. A method of producing electrical insulating metal-clad laminates, comprising steps of mixing mica powder with glass powder and an oxidant comprising a member of the group consisting of sodium nitrate, sodium nitrite, potassium nitrate and potassium nitrite and forming a tablet of said mixture covering an oxidized surface of a metal sheet with enamel frit, placing said tablet on said enamel frit covered oxidized surface of said metal sheet, baking said enamel frit covered oxidized metal sheet, on which said tablet has been placed at a temperature of at least at 1120° F. and pressing said baked metal sheet and tablet while being prevented from sudden cooling and solidification of the tablet and enamel frit carried on said sheet whereby said tablet is integrated with the porcelain enamel covered metal sheet.

4. A method of producing electrical insulating metal-clad laminates, as claimed in claim 3, in which said surface of said metal sheet has been plated with another metal before said surface is oxidized.

References Cited

UNITED STATES PATENTS 3,324,543  6/1967  McVey.

OTHER REFERENCES

New Techniques in Glass-to-Metal Sealing, Joseph A. Pask, Preceedings of the IRE, Waves & Electronics Section, 1947.

S. LEON BASHORE, Primary Examiner

ROBERT L. LINDSAY, JR., Assistant Examiner

U.S. Cl. X.R.

65—59; 106—49; 161—196